Patented June 21, 1949

2,473,817

UNITED STATES PATENT OFFICE 2,473,817

PRODUCTION OF RIBOFLAVIN

Allen S. Phelps, Orangeburg, N. Y., assignor, by mesne assignments, to American Cyanamid Company, New York, N. Y., a corporation of Maine No Drawing. Application December 11, 1945, Serial No. 634,395

2 Claims. (Cl. 195—35)

This invention relates to an improvement in the art of producing riboflavin. More particularly, the present invention is concerned with improvements in the method in which the fungus Eremothecium ashbyii is used to produce riboflavin by fermentation of a liquid, nutrient medium. The invention includes the fermentation process as well as the new medium.

In the co-pending application of Henry D. Piersma, Serial No. 505,189, filed October 6, 1943, now United States Patent 2,400,710, issued May 21, 1946, a process is described and claimed by which good yields of riboflavin are produced in a liquid medium comprising water, an animal proteinaceous substance, malt extract, and sugar by the action of the organism Eremothecium ashbyii. By this process yields of riboflavin of the order of 200 gammas per milliliter are obtained. Occasionally, in a laboratory experiment, the yields of riboflavin are somewhat higher.

Although one of the essential features of novelty of the Piersma process is the use of malt extract, the use of which leads to much higher than normal yields of riboflavin, the presence of animal proteinaceous material is a critical and necessary part of the fermentation liquor. Although the process of the Piersma application just mentioned discloses the use of a wide variety of animal proteinaceous materials, the particular products described are all derived from animal tissue. This material is water-insoluble, is generally non-homogeneous in chemical composition and physical form and is frequently obtained in a contaminated condition with bacterial decomposition in a well advanced state. In short, animal tissue is not the most desirable substance that could be used in a process which is easily contaminated with foreign organisms which cause greatly diminished yields of riboflavin.

The process of the co-pending application of Henry D. Piersma, Serial No. 572,747, filed January 13, 1945, represents a considerable improvement over that of the first named Piersma application, particularly as to the yields of riboflavin obtainable. This latter process also employs the organism Eremothecium ashbyii in a liquid medium containing malt extract, sugar, and a proteinaceous substance. In this process, however, the protein is first modified by enzymatic digestion with proteolytic enzymes. As a result of the enzymatic treatment it is possible to obtain greatly increased yields of riboflavin, generally on the order of 400 gammas per milliliter although, as might be expected, individual laboratory experiments sometimes show higher yields of riboflavin.

This second named process has been used for the commercial production of riboflavin with very good results. It is subject, however, to the earlier mentioned disadvantages caused by the use of animal tissue. It is also subject to the disadvantage of requiring an enzymatic digestion, which adds time and expense to the process. Although some of the animal tissue is solubilized by the enzymes, most of it remains insoluble and must be filtered from the liquor at the end of the fermentation process. Also, as in the case of the undigested animal tissue, and because of the fact that the fermentation is usually conducted at substantial neutrality, the medium is subject to contamination by organisms which interfere with the production of riboflavin.

In view of the disadvantages of the use of water-insoluble animal proteinaceous material in the riboflavin process, it is one of the objects of the present invention to provide an improved fermentation medium which eliminates or minimizes the disadvantageous features of media formerly employed. One of the objects of the present invention is, therefore, to prepare a liquid fermentation liquor in which all, or practically all, of the nutrient medium is in solution thus making it possible to sterilize the liquor, filter it, and otherwise handle it with greater facility. Such a liquor is also less apt to become contaminated during the fermentation process. It is also an object of the invention to eliminate the expensive enzyme digestion treatment, which is necessary for best results when using animal tissue of the type heretofore employed. Still another object of the present invention is to provide a fermentation liquor which is simpler to prepare and easier to handle in the plant. Other objects of the invention are to provide a fermentation liquor which is more homogeneous than those hitherto available, and to make it possible to shorten the cooking cycle, and generally increase the capacity of the plant equipment to produce riboflavin in a shorter time in higher yields.

The aforesaid objects, and others which will be apparent hereinafter, are accomplished by me by the use of a liquid medium for the production of riboflavin by the action of the fungus *Eremothecium ashbyii* which comprises water, a sugar, malt extract, and milk or a milk product containing solubilized casein. The use of casein as the animal proteinaceous substance eliminates most of the disadvantages of the water-insoluble animal tissue previously employed and at the same time results in greatly increased yields of riboflavin. As will be seen from the examples which will be described hereinafter, yields of riboflavin between 500 and 600 gammas per milliliter are usually obtainable when using the improved medium of the present invention. As the casein is used in a solubilized form, the medium can be quickly and easily prepared, sterilized, pumped, filtered, and otherwise handled in the plant with a minimum of effort. Because of the absence of large particles of solid material it is easier to completely sterilize it and there is less danger of contamination by harmful organisms. As will be apparent, enzymatic digestion is avoided, thus lowering the cost of the process and shortening the time required for processing the material.

The casein which is used may be the ordinary casein of commerce, which is prepared by treating milk with an acid to precipitate casein which is then washed and dried. In using this material it is first solubilized by treatment with an alkali, such as ammonia, caustic soda, sodium carbonate, etc. in a manner known to those in the art. Instead of using commercial dried casein I may employ freshly precipitated casein or, if available, casein containing products in which the casein is already solubilized such as whole milk, skim milk, fresh milk, sour milk, butter milk, evaporated milk, and the like. Other milk products which contain a substantial amount of casein and which may be solubilized may also be used. The term solution as used includes colloidal solutions in which the casein does not settle out on standing. The concentration of the milk product in the fermentation liquor is adjusted on the basis of the casein content to a level equivalent to about 0.4 to 4.0% by weight of casein (dry basis) based on the total weight of the liquid medium. The preferred range is around 0.8 to 1.0%.

The malt extract employed in the medium is an article of commerce and consists essentially of a concentrated, aqueous extract of malted grain, such as barley. As will appear obvious, ground malt itself may be added to the mash in lieu of malt extract but such material is not ordinarily employed as it adds insoluble substances to the fermentation liquor. The presence of hop extracts, which are sometimes found in commercial malt extracts, are not deleterious and may, in fact, be advantageous adjuncts for the growth media. The amount of malt extract used in the medium may be varied from about 0.2% to 30% dry basis which is equivalent to about 0.5 to 5.0% by weight as received, the optimum amount appearing to be from about 0.7 to 1.0% dry basis.

The sugar used in the medium is preferably glucose or one of the invert sugars or sugar syrups of commerce. Other sugar, such as sucrose, fructose, or mannose, lactose and galactose may also be used to supply the carbohydrate requirements of the medium. The term "sugar" as used hereinafter and in the claims does not include the maltose or dextrins of the salt extract. The amount of sugar in the medium is ordinarily within the range of 0.2% to 4.0% by weight, based on the total weight of the medium. The preferred range is about 0.3% to about 0.6%.

As previously indicated, the riboflavin-producing organism of the process is the fungus *Eremothecium ashbyii*. The fermentation of the nutrient liquor with this organism is carried out within the range of about 20° C. to 35° C., the preferred range being from about 30° to 32° C. The fermentation process is conducted at substantial neutrality, the pH of the mash being adjusted to within the range of 6.0 to 8.5 before sterilizing. Fermentation is preferably carried out between pH 6.5 and pH 7.5.

Inasmuch as the fungus *Eremothecium ashbyii* requires oxygen for satisfactory growth and production of riboflavin, it is necessary to aerate the medium during the fermentation process. This may be accomplished by growing the organism with agitation in an open vessel containing a thin layer of medium. In such a process the ratio of surface of medium exposed to the atmosphere in square centimeters to the volume of the medium in cubic centimeters should be at least 1.0.

A more practical way of fermenting large volumes of the liquor is to adopt the conventional practice of blowing a finely dispersed stream of air through the liquor contained in a tank. Inasmuch as this method of supplying air to aerobic organisms in deep tank cultures has been practiced for many years by the fermentation industry, detailed discussion would appear to be unnecessary. In general, however, the diffusers should have the smallest openings practical so that the air is finely dispersed through the medium. The air flow should be at least 0.25 cubic foot per minute per square foot per surface of the mash. Larger amounts of air are more desirable, preferably from about 1 to 2 cubic feet per minute per square foot of liquid surface. Under some circumstances mechanical agitation may be desired but ordinarily the agitation of the liquor caused by aeration will be sufficient.

The progress of the fermentation can be readily ascertained by withdrawal of samples from the fermentation vessel. The duration of the active phase of the fermentation is subject to considerable variation and may be as short as 60 hours or as long as 140 hours. Best results have been obtained in plant practice at around 90 to 100 hours.

To illustrate the invention in greater detail the following examples are given. These examples are based on laboratory experiments but analogous results have been obtained by large scale fermentations in tanks containing several thousand gallons of medium.

EXAMPLE 1

A series of media containing various milk products was prepared. These media each contained 1.75% of a commercial malt extract (weight as received, 50–60% solids), 0.5% of Cerelose (glucose hydrate, dry weight), and the indicated amount of milk product. The media were adjusted to a pH between 6.5 and 6.9 before sterilization. A quantity of the media, 25 ml. portions, was placed in 250 ml. Erlenmeyer flasks, sterilized at 15 pounds steam pressure for 30 minutes and inoculated with a culture of *Eremothecium ashbyii*. Incubation was carried out at 30° to 32° C. with the flasks in a shaking machine which completed 120 oscillations per minute for a period of 88 hours. The results of this series of experiments are shown in the following table. The ammonia treated casein was a commercial brand of casein which had been solubilized by treatment at 45° to 50° C. in 10% solution with 0.7 ml. of 26% ammmonium hydroxide for each 10 grams of casein.

TABLE 1

*Riboflavin yield from various milk products*

| Milk Product | Amount [1] | Average Riboflavin Yield |
|---|---|---|
| Whole milk | 8 cc | 605 |
| Raw Skim Milk | 8 cc | 650 |
| Dry Skim Milk | 0.8 gm | 510 |
| Condensed Milk | 4 cc | 670 |
| Evaporated Milk | 4 cc | 690 |
| Ammonia treated dried casein | 0.25 gm | 580 |

[1] Quantity used per 25 ml. of medium.

As will be seen from the foregoing results, very excellent yields of riboflavin are obtained when using casein from a variety of milk products.

EXAMPLE 2

To illustrate the fact that casein is the essential factor of the milk products employed a second series of experiments was carried out with different milk fractions. To obtain these fractions raw skim milk was adjusted to a pH of 4.7 with sulfuric acid and heated to 55° C. The resulting curd was filtered off and washed twice by suspending in water and buffered in water at a pH of 4.7 with a small quantity of sodium acetate. This washed precipitate dissolved by stirring with excess alkali and adjusted to a pH between 6.5 and 6.8 is referred to as "casein." The combined filtrates from the above treatment were adjusted to 6.5, heated to 100° C., filtered hot, and the precipitate washed with hot water. This precipitate, dissolved by stirring with excess alkali and adjusted to 6.5 to 6.8, is referred to as "albumin." The final combined filtrates from the above steps are referred to as "whey." Preparation, sterilization, inoculation and incubation of the media were as described in connection with Table 1. The results of this series of tests were as follows:

TABLE 2

*Fractions of raw skim milk*

| Raw Skim | Whey | Casein | Albumen | Average Riboflavin Yield, γ/ml. |
|---|---|---|---|---|
| X | | | | 532 |
| | X | | | 208 |
| | | X | | 612 |
| | | | X | 192 |
| | X | X | | 536 |
| | | | X | 232 |
| | X | X | X | 540 |
| | X | X | X | 540 |

[1] All fractions were added to each flask in the proportions present in 8 cc. of raw skim milk.

These results clearly demonstrate that casein is the factor in milk which leads to the high yields of riboflavin.

EXAMPLE 3

To demonstrate the fact that casein alone is insufficient to result in high yields of riboflavin another series of experiments was conducted. In this series the basal medium was varied by eliminating certain of the nutrient elements as indicated. Otherwise the conditions of the fermentation were as in the preceding examples. The casein used was a commercial grade of casein which had been solubilized by treatment with ammonium hydroxide as in Example 1. The results were as follows:

TABLE 3

| Casein 1% | Malt Extract 1.75% | Cerelose .5% | Average Riboflavin, γ/ml. |
|---|---|---|---|
| X | | | 12 |
| | X | | 16 |
| | | X | 3 |
| | X | X | 20 |
| X | | X | 65 |
| X | X | | 110 |
| X | X | X | 425 |

The first three entries in the table show that none of casein, malt extract or Cerelose when used alone will allow the *Eremothecium ashbyii* to produce any significant amount of riboflavin. When malt extract and Cerelose are used together with the omission of casein only slightly improved yields of riboflavin are obtained. The table also shows that when either malt extract is omitted or when the sugar is omitted, the yields of riboflavin are not satisfactory. However, when all three essential components are present, very good yields of riboflavin are obtained.

These results demonstrate the fact that the improved results obtained by the present invention are not entirely dependent upon any one factor but are the results of the combined effects of the three essential components of the medium: casein, malt extract, and sugar, in substantially the proportions indicated. As previously noted, however, some variation is permissible in these proportions and, in fact, better results may be obtained when the various components are in slightly different relationship to each other. Optimum conditions are easily determined by those skilled in the art with a small amount of experimentation.

I claim:

1. A process of producing riboflavin which comprises growing the fungus *Eremothecium ashbyii* in an aqueous medium containing in solution the essential components water, about 0.4 to 4.0% by weight of casein, from about 0.2 to 3.0% by weight of malt extract and, from 0.2 to 4.0% by weight of sugar while aerating the medium.

2. A process of producing riboflavin which comprises the steps of inoculating an aqueous medium containing in solution the essential components water, about 0.4 to 4.0% by weight of casein, from about 0.2 to 3.0% of malt extract, and from 0.2 to 4.0% of glucose with the fungus *Eremothecium ashbyii* and allowing fermentation to take place at a temperature between about 20° to 35° C. for a period of time between 60 and 140 hours while aerating the medium.

ALLEN S. PHELPS.

REFERENCES CITED

The following references are of record in the file of this patent:

UNITED STATES PATENTS

| Number | Name | Date |
|---|---|---|
| 2,128,845 | Myers | Aug. 30, 1938 |
| 2,364,008 | Stuart | Nov. 28, 1944 |
| 2,369,680 | Meade | Feb. 20, 1945 |
| 2,374,503 | Rudert | Apr. 24, 1945 |
| 2,400,710 | Piersma | May 21, 1946 |

OTHER REFERENCES

Raffy: Comptes Rendus, vol. 209 (1939), pages 900 to 902.